United States Patent
Voaklander

(10) Patent No.: US 10,060,591 B2
(45) Date of Patent: Aug. 28, 2018

(54) BODY BOARD WITH LED LIGHT ROPE, FLEXIBLE SOLAR PANEL AND MOLDED CHANNELS

(71) Applicant: Susan Voaklander, Cardiff, CA (US)

(72) Inventor: Susan Voaklander, Cardiff, CA (US)

( * ) Notice: Subject to any disclaimer, the term of this patent is extended or adjusted under 35 U.S.C. 154(b) by 0 days.

(21) Appl. No.: 15/915,366

(22) Filed: Mar. 8, 2018

(65) Prior Publication Data
US 2018/0195681 A1    Jul. 12, 2018

Related U.S. Application Data

(63) Continuation-in-part of application No. 15/362,414, filed on Nov. 28, 2016.

(51) Int. Cl.
| | |
|---|---|
| *B63B 35/79* | (2006.01) |
| *F21S 45/50* | (2018.01) |
| *F21S 4/26* | (2016.01) |
| *F21S 9/03* | (2006.01) |
| *F21V 15/01* | (2006.01) |
| *H02S 99/00* | (2014.01) |
| *H02S 40/38* | (2014.01) |
| *F21V 19/04* | (2006.01) |
| *F21V 23/02* | (2006.01) |
| *F21V 31/00* | (2006.01) |
| *F21W 104/00* | (2018.01) |
| *F21W 107/20* | (2018.01) |
| *F21Y 115/10* | (2016.01) |

(52) U.S. Cl.
CPC .............. *F21S 45/50* (2018.01); *B63B 35/79* (2013.01); *F21S 4/26* (2016.01); *F21S 9/037* (2013.01); *F21V 15/01* (2013.01); *F21V 19/04* (2013.01); *F21V 23/023* (2013.01); *F21V 31/00* (2013.01); *H02S 40/38* (2014.12); *H02S 99/00* (2013.01); *B63B 2035/7903* (2013.01); *F21W 2104/00* (2018.01); *F21W 2107/20* (2018.01); *F21Y 2115/10* (2016.08)

(58) Field of Classification Search
CPC ...... B63B 35/79–35/7909; B63B 45/00–45/06
See application file for complete search history.

(56) References Cited

U.S. PATENT DOCUMENTS

| | | |
|---|---|---|
| 8,469,569 B1 | 6/2013 | Tunnicliffe |
| 8,882,554 B2 | 11/2014 | McKinney |
| 2011/0309772 A1 | 12/2011 | Forgey |
| 2014/0063828 A1 | 3/2014 | Roach |

(Continued)

*Primary Examiner* — Sean Gramling
(74) *Attorney, Agent, or Firm* — Eric Hanscom

(57) ABSTRACT

This invention is directed toward a body board, used for riding ocean waves, which has one or more removable LED light ropes disposed in one or more channels that have been molded into the top, bottom, or sides of the body board. The channels are removably covered with a water-resistant covering that can be opened to remove or exchange the LED lights. The body board also includes a cavity into which a battery is placed, where the battery powers the LED's, and means of controlling the LED's. The battery cavity, in the first embodiment, is also covered by a water-resistant covering that can be opened to access the battery for removal or replacement. A solar panel is embedded in the deck of the body board and connected to the battery for recharging when the body board is left in the sun.

15 Claims, 5 Drawing Sheets

(56) References Cited

U.S. PATENT DOCUMENTS

2015/0217575 A1    8/2015  Dayan
2015/0217675 A1*   8/2015  Dayan .................. A63C 5/03
                                                      362/544

\* cited by examiner

BODY BOARD WITH LED LIGHT ROPE, FLEXIBLE SOLAR PANEL AND MOLDED CHANNELS

CROSS REFERENCE TO RELATED APPLICATIONS

This application is a continuation-in-part and claims priority to U.S. Utility application Ser. No. 15/362,414 filed Nov. 28, 2016, which is attached to this application and the contents of which are incorporated by reference.

STATEMENT REGARDING FEDERALLY SPONSORED RESEARCH OR DEVELOPMENT

This invention was not federally sponsored.

BACKGROUND OF THE INVENTION

Field of the Invention

This invention relates to the general field of bodyboards, and more specifically, to a bodyboard capable of being used in ocean waves with channels that contain LED light ropes. The LED light ropes are removable as they are covered by a cover that can be attached and removed at the user's discretion to change one type of LED rope for another. A solar panel embedded in the deck of the bodyboard recharges a battery which powers the solar lights. The goal of the invention is to provide a lighted bodyboard for use in the ocean, where the lights form some sort of decorative pattern, but to be tough enough to withstand the rigors of ocean surfing.

Brief Summary of the Invention

First, it should be noted that the phrases "body board" and "bodyboard" are interchangeable. The priority document referred to them as "body boards", but over time, the trademarked phrase "Boogie Board" has fallen into disfavor and has been replaced with "bodyboard". The channels of the body board, or bodyboard, are covered by a removable, water-resistant covering that allows a user to access the LED light ropes for removal or replacement, such that a user can custom tailor the appearance of the board to his or her preference. It is contemplated that the channels in the bodyboard can be on some combination of the sides, top and bottom of the board, and can be effectively waterproofed such that a user of the invention can take out the strings of LED's and replace them with others—perhaps of a different color or type—then seal back up the channel and put the bodyboard back in the water. The LED's are powered by a battery that rests in a cavity in the bodyboard, where the cavity is also covered by a water-resistant covering. This allows a user to remove the battery for recharging/replacement. There is also a controller that regulates flow of electrical current from the battery to the LED light ropes. This controller can be manually operated on the bodyboard itself, or remote controlled through the use of RF frequencies. One or more solar panels embedded in the deck of the bodyboard provide recharging power for the battery.

The general concept behind this invention is that it can be used with a variety of bodyboard sizes and shapes. While the average "adult" bodyboard—usually between 3' and 4' in length—is used for purposes of illustration in this application, it is also contemplated that the same technology could be used for smaller bodyboards that could be created for children.

History of the invention's industry. Surfing and bodyboards have been known in the prior art for many decades. Surfboards can be decorated in a variety of ways, including airbrushing the foam blank and using different colors of resins. Bodyboards, on the other hand, are generally made from a molded piece of foam covered "skins" that cover the top, bottom, and sides. These skins can be of different colors, and have designs imprinted on them. One embodiment has fiberclad covers with, optionally, characters on the covers. As opposed to surfboards, which are generally rigid foam covered by epoxy resin or fiberglass impregnated with resin, bodyboards are made from a flexible foam core that bends when the bodyboard is subjected to the forces of an ocean wave.

There is prior art on the idea of putting lights on recreational boards. For example, US Publication No. 2014/0063828 to Roach teaches a skirt with LED's that can be attached to a stand-up paddle board. The current invention provides significant advantages over Roach, in that a skirt would not survive being pummeled by ocean surf. Also, the stand-up paddle board is a generally rigid board, like a surfboard, and molding or routing a channel into its side would not be economically feasible (hence, the use by Roach of a skirt).

Another relevant item of prior art is US Publication No. 2015/0217675 to Dayan. Dayan shows what appears to be a snow toy, complete with handles so the user can hang on. In the ocean, handles such as these would be ripped off quickly by the surf, and, indeed, could pose a problem to the user if he/she became entangled in a handle. Dayan also relies on a "light transmissive" foam with a lighting circuit embedded therein. The current invention does not require "light transmissive" foam, as the channel and the clear cover allow the light rope to transmit no matter what the opacity of the foam.

Dayan also discusses LED's that are partially embedded in the "core" and partially embedded in the shell. The current invention does not require any modification of "the shell" as the channel is covered by a removable cover. Dayan also teaches cutting the core with a knife to create the channel in which the LED sits. The current invention calls for the light channel to be molded into the foam core during its manufacturing process, so there is no need to a) endanger anyone who is using a (presumably) sharp knife to try to cut channels, and b) endanger the structural integrity of the board by cutting into it.

Dayan makes casual reference to the possibility of a solar panel, but not describe where it could be located or how it would function. The current invention limits any solar panel to being embedded in the deck (top side) of the bodyboard and to be flexible such that it does not break when the bodyboard is bent during use.

Thus, the invention is hereby presented. The invention is directed toward a bodyboard, used for riding ocean waves, with one or more strings of optionally removable LED light ropes disposed in one or more channels that have been molded into the top, bottom, and/or sides of the bodyboard during the manufacturing process of creating the core. The channels are covered with a water-resistant covering that can be opened to remove or exchange the LED lights. The bodyboard also includes a cavity into which a battery is placed, where the battery powers the LED's, and means of controlling the LED's. The battery cavity is also covered by a water-resistant covering that can be optionally opened to access the battery for removal or replacement. There is a flexible solar panel embedded into the deck of the bodyboard, that flexes as the bodyboard flexes during surfing.

OBJECTS OF THE INVENTION

It is therefore an object of the present invention to provide an enjoyable toy to a youngster who desires a bodyboard with colored LED light ropes creating a decoration on the bodyboard, where the bodyboard could be used in the ocean.

Other objects of the invention include a) allowing a user to customize the bodyboard to create a variety of colors and flashing patters with the LED light ropes, b) providing a removable, waterproof channel that will allow a user to replace existing LED light ropes to change the color and/or flashing pattern, c) an enjoyable toy to a youngster who desires a bodyboard with colored LED lights creating a decoration on the bodyboard, where the bodyboard could be used in any aquatic environment, including but not limited to the ocean, and, d) providing a waterproof, permanent, transparent or translucent covering over the channels in an alternative embodiment of the idea, and as an additional embodiment, containing a solar-powered, waterproof battery that is contained in a non-removable compartment, such that it remains charged from the solar cells attached to it, where the solar cells are flexible, and embedded into the deck of the bodyboard.

There has thus been outlined, rather broadly, the more important features of the invention in order that the detailed description thereof may be better understood, and in order that the present contribution to the art may be better appreciated. There are additional features of the invention that will be described hereinafter and which will form the subject matter of the claims appended hereto. The features listed herein and other features, aspects, and advantages of the present invention will become better understood with reference to the following description and appended claims. The accompanying drawings, which are incorporated in and constitute part of this specification, illustrate embodiments of the invention and, together with the description, serve to explain the principles of the invention.

It should be understood that while the preferred embodiments of the invention are described in some detail herein, the present disclosure is made by way of example only and that variations and changes thereto are possible without departing from the subject matter coming within the scope of the following claims, and a reasonable equivalency thereof, which claims I regard as my invention.

BRIEF DESCRIPTION OF THE FIGURES

One preferred form of the invention will now be described with reference to the accompanying drawings.

DETAILED DESCRIPTION OF THE FIGURES

Figure 1:
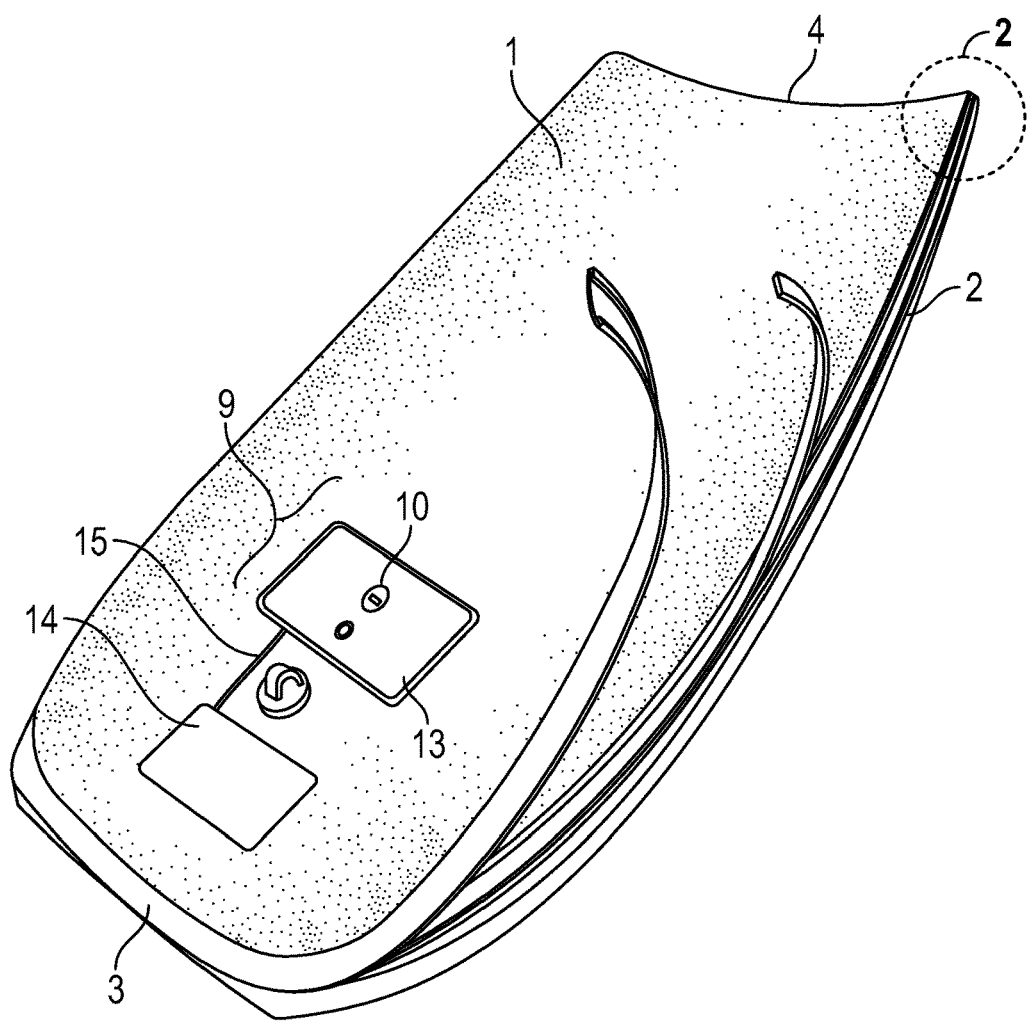
FIG. 1 is a perspective view of a bodyboard with and embedded LED rope according to a preferred form of the invention.

Many aspects of the invention can be better understood with references made to the drawings below. The components in the drawings are not necessarily drawn to scale. Instead, emphasis is placed upon clearly illustrating the components of the present invention. Moreover, like reference numerals designate corresponding parts through the several views in the drawings. Before explaining at least one embodiment of the invention, it is to be understood that the embodiments of the invention are not limited in their application to the details of construction and to the arrangement of the components set forth in the following description or illustrated in the drawings. The embodiments of the invention are capable of being practiced and carried out in various ways. In addition, the phraseology and terminology employed herein are for the purpose of description and should not be regarded as limiting.

FIG. 1 is a perspective view of a bodyboard with embedded LED lights according to a preferred form of the invention. The bodyboard has a deck 1, rails 2, a bow 3 and a stern 4. On the deck 1 there is a battery compartment 9, into which the battery is removably secured. The battery compartment is waterproof due to a battery compartment cover 13, that can be removed through an access screw 10. A flexible solar panel 14 is embedded into the deck of the bodyboard, and connected to the battery by solar panel wiring 15. The battery can be turned on and off through a waterproof control button 11 and can be charged through a waterproof charging port, or through the solar charging system. From the battery, one or more LED light ropes are dispensed in channels routed into the deck, rails and/or bottom of the bodyboard. To use the invention, the user inserts LED light ropes into the channels, secures a waterproof cover, turns on the LED light ropes by pushing the waterproof control button, and goes bodyboarding.

Figure 2:
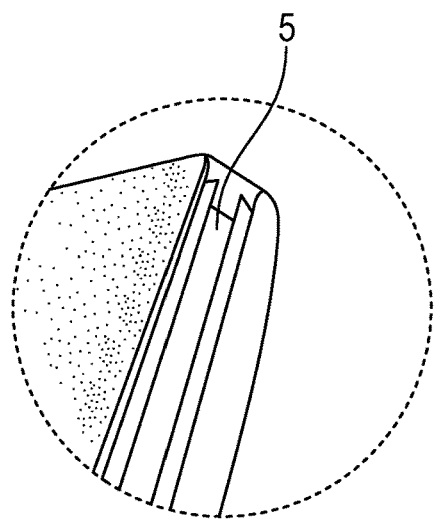
FIG. 2 is a close-up view of the "channel" into which the LED light rope is placed.

FIG. 2 is a close-up view of the "channel" 5 into which the LED light rope is placed according to a preferred form of the invention.

Figure 3:
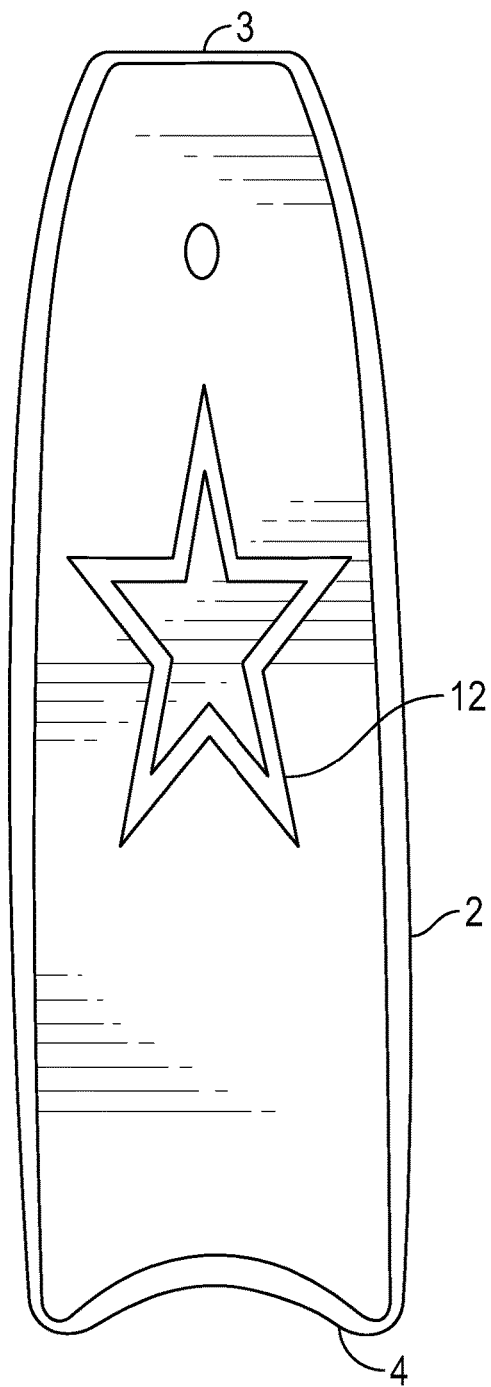
FIG. 3 is a bottom view of a bodyboard with an embedded LED light rope according to a preferred form of the invention.

FIG. 3 is a bottom view of a bodyboard with embedded LED rope according to a preferred form of the invention. In the particular embodiment, a decorative pattern 12 is created in the shape of a star. It should be noted that the LED light ropes can be placed anywhere on the board, including the bottom, as shown here, the deck, the rails 2, and even the bow 3 and stern 4.

Figure 4:
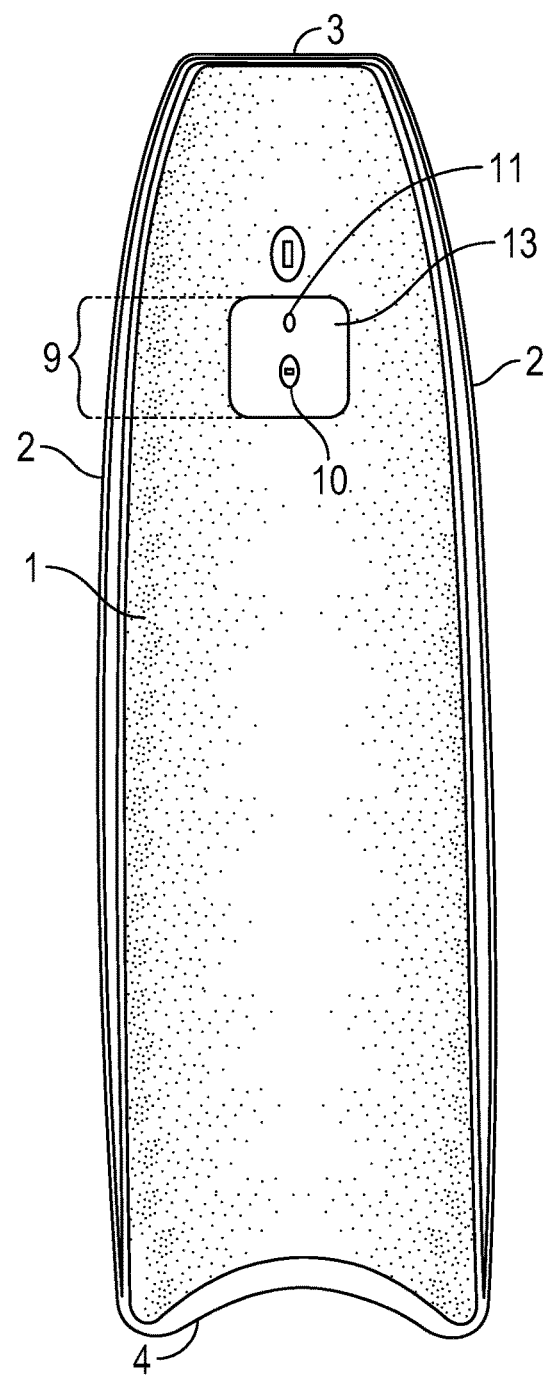
FIG. 4 is a top view of a bodyboard with an embedded LED rope according to a preferred form of the invention.

FIG. 4 is a top view of a bodyboard with embedded LED rope according to a preferred form of the invention. The battery compartment 9 is a cavity that has been molded or routed into the deck, in this case, of the bodyboard. Inside the battery compartment is a battery (not shown in this figure), which is covered by a waterproof battery compartment cover 13. There are several possible embodiments of the battery. First, it could be a water-resistant battery enclosed in a removable, water-resistant cover such that the battery could be removed for recharging. Second, the battery could be permanently encased by a non-removable cover where the battery is electrically attached to one or more solar panels attached to the top, side, or bottom of the board, or even resting on or embedded in the cover itself. The battery and the LED light ropes are controlled through a waterproof control button 11 which can be pushed to turn the LED light ropes on and off. In another embodiment of the invention, the waterproof control button 11 has several different settings that cause different light patterns to illuminate in the LED light ropes. The battery compartment cover 13 forms a waterproof seal over the battery compartment 9, and can be accessed through an access screw 10. Thus, before the user enters the water he/she can turn on the LED light ropes, then enjoy a water session, before returning to dry land and removing the battery for charging. In another embodiment, a waterproof charging station is included in the battery compartment cover 13 so that that user can charge the battery while the battery is still in the battery compartment. Again, it is contemplated that while a preferred embodiment of the invention calls for the LED light ropes to form a decorative pattern on the bottom of the bodyboard, as in FIG. 3, it is also contemplated that LED light ropes could be places on the rails 2, deck 1, or even the bow 3 and stern 4. It is further contemplated that LED light ropes, including strong ones, could be mounted on the bow 3 of the bodyboard to enhance the user's ability to see during low light and night time conditions.

Figure 5:
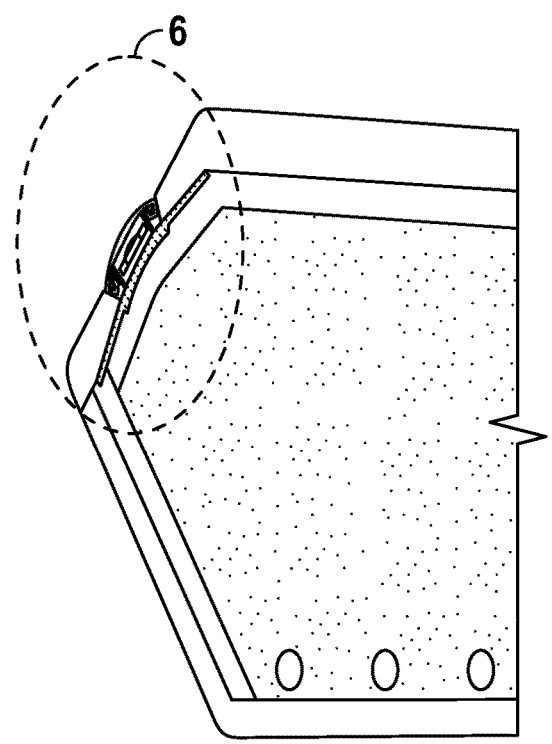
FIGS. 5 through 7 are cross sectional views of the channel in which the LED rope is placed.
Figure 6:
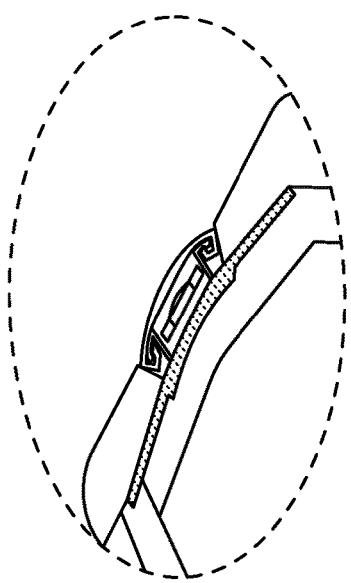
Figure 7:
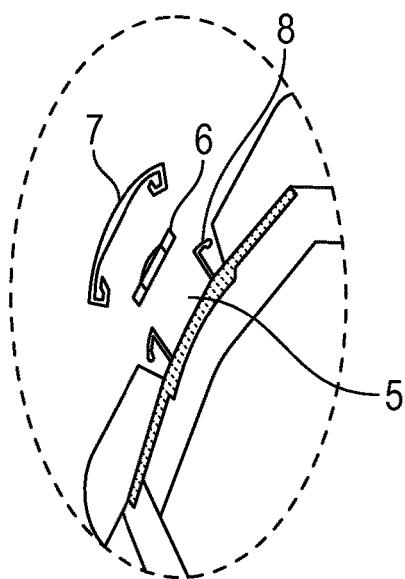

FIGS. 5 through 7 are cross sectional views of the channel in which the LED lights are placed. An LED light rope 6 is placed in a channel 5. A waterproof cover 7, is secured with grippers 8, such that water does not flood the channel 5. If the user wishes to change the colors, or flashing pattern of the LED's, he/she need only to remove the waterproof cover 7, and replace the LED light rope 6 with another one. In another embodiment, there are more than one color of lights in the channel, or the lights are capable of changing color, in which case it is not necessary to remove them from the channel, but rather a user can change the colors by merely pushing a control button or using a remote controller.

Figure 8:
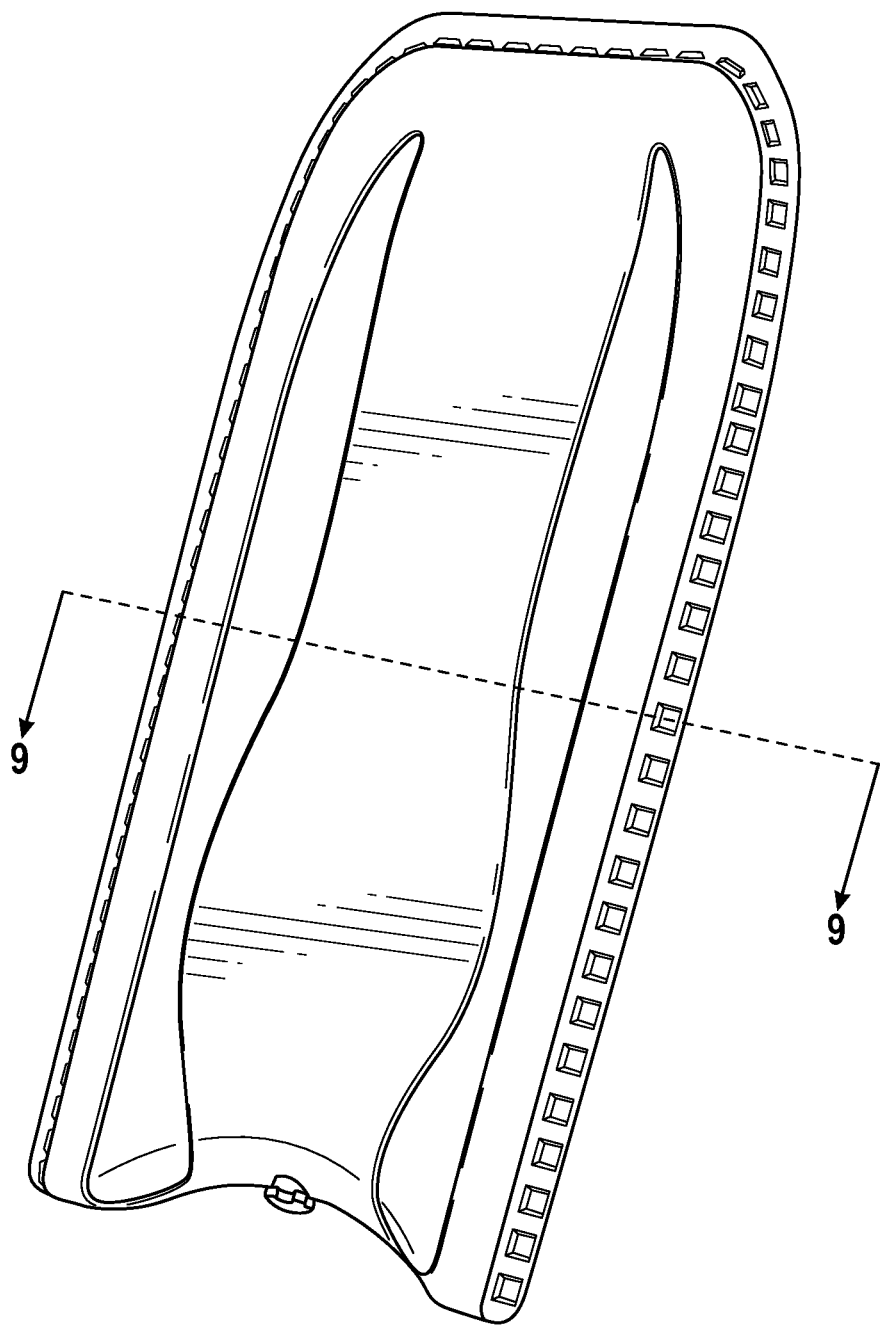
FIG. 8 is a bottom view of a bodyboard showing the location of the cross-sectional view shown in FIG. 9.
Figure 9:
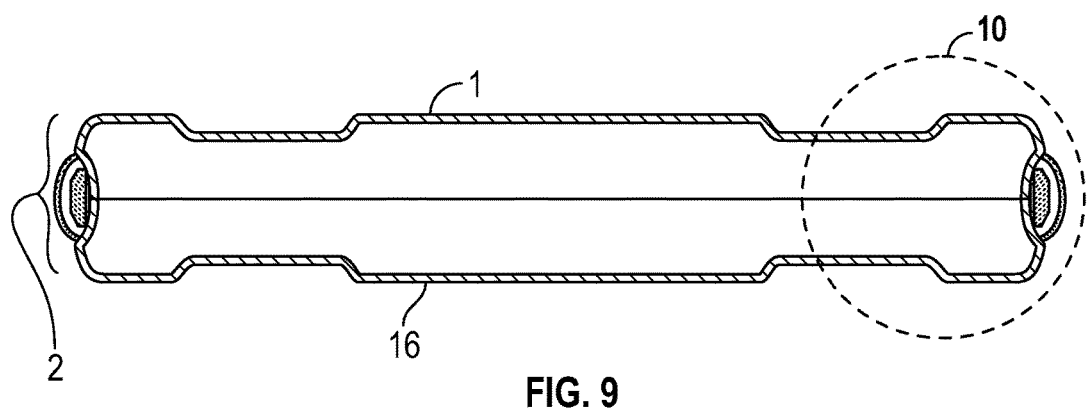
FIG. 9 is a cross-sectional view.

FIG. 8 is a bottom view of a bodyboard showing the location of the cross-sectional view shown in FIG. 9.

FIG. 9 is a cross-sectional view showing how the core 17 is covered by a skin 18 on both the deck 1 and the bottom 16 of the bodyboard. Item 10 shows where the close-up view of FIG. 10 originates.

Figure 10:
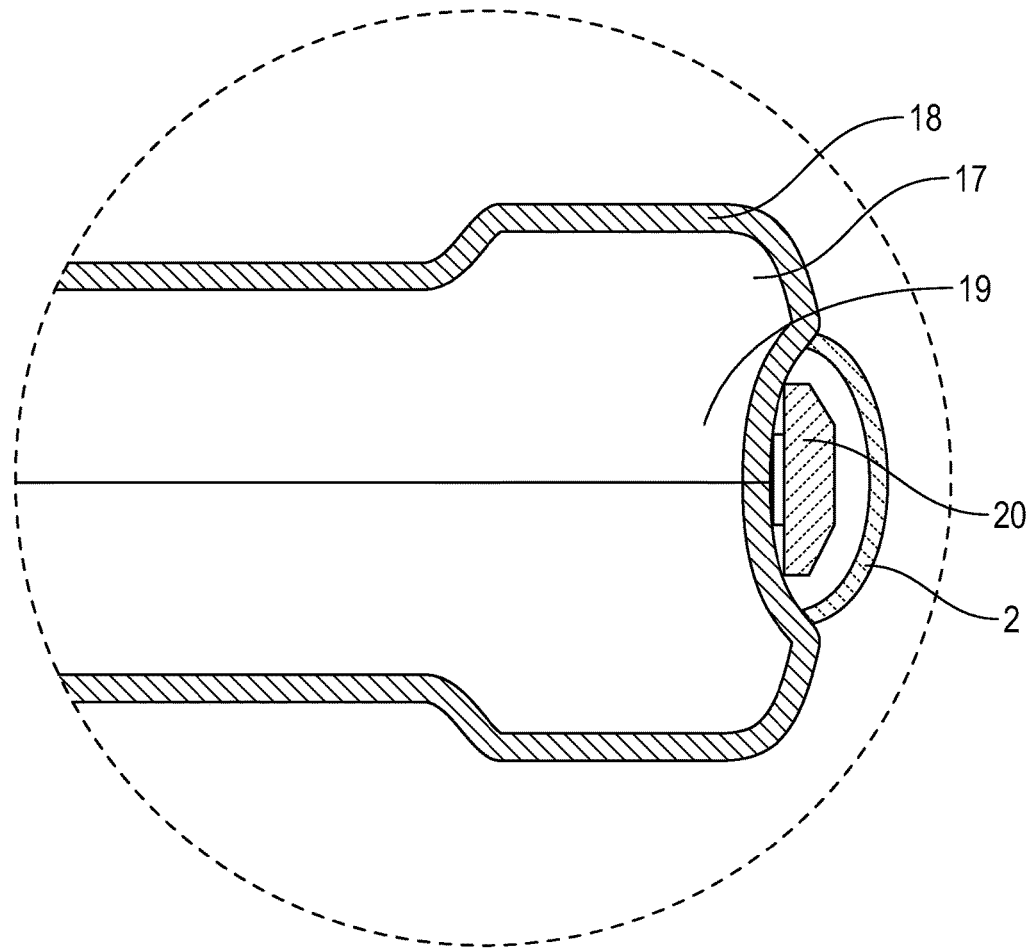
FIG. 10 is a close-up view of one rail of the bodyboard.

FIG. 10 is a close-up view of one rail of the bodyboard. The foam core 17 is covered by a skin 18. The foam core has a molded channel 19 that is covered by the skin 18. Inside the molded channel 19 is an LED light rope 20, which is covered by a removable cover 2. Because the molded channel 19 is molded into the foam core 17, the structural integrity of the bodyboard is not compromised as if the channel was cut with a knife or routed into an existing foam core. The LED light rope 20 is a substantial improvement over the strings of LED's used previously. Most LED light ropes are sealed inside a clear, waterproof cylinder, such that the removable cover 20 provides a second layer of waterproof protection. The prior art shows use of LED light "strings" which are series of LED's connected by wiring, where there is a potential "short" at every connection. Removable cover 20 can be attached by grippers or a detachable adhesive.

It should be understood that while the preferred embodiments of the invention are described in some detail herein, the present disclosure is made by way of example only and that variations and changes thereto are possible without departing from the subject matter coming within the scope of the following claims, and a reasonable equivalency thereof, which claims I regard as my invention.

All of the material in this patent document is subject to copyright protection under the copyright laws of the United States and other countries. The copyright owner has no objection to the facsimile reproduction by anyone of the patent document or the patent disclosure, as it appears in official governmental records but, otherwise, all other copyright rights whatsoever are reserved.

REFERENCE NUMBERS USED

1. Bodyboard deck
2. Bodyboard rails
3. Bodyboard bow
4. Bodyboard stern
5. Channel
6. LED light rope
7. Cover
8. Grippers
9. Battery compartment.
10. Access screw.
11. Waterproof control button
12. Decorative pattern.
13. Waterproof battery compartment cover.
14. Solar panel
15. Solar panel wiring
16. Bodyboard bottom
17. Bodyboard core
18. Bodyboard skin
19. Molded channel
20. LED light rope
21. Removable cover That which is claimed is:

1. A bodyboard for surfing ocean waves with LED light decorations, comprising: a bodyboard, where the bodyboard has a deck, a bottom, a bow, a stern, and two rails, where the two rails comprise a port rail and a starboard rail, where the bodyboard has a length, where the bodyboard has a height and at least one channel, where the at least one channel is molded by a molding process, where the molding process created the at least one channel into the bodyboard, at least one LED light rope comprising LED lights, a cover, a battery, a battery compartment, and a battery compartment cover, where the at least one channel comprises a cavity with a cavity width, a cavity length, and a cavity depth, where the at least one LED light rope is disposed in the at least one channel, and covered by the cover, and the battery is disposed in the battery compartment, and covered by the battery compartment cover, and where the at least one LED light rope is electronically attached to the battery, where the cover is removable such that a user can remove a first type of LED light rope and replace it with a second type of LED light rope, where the bodyboard additionally comprises one or more solar panels, where the one or more solar panels are flexible solar panels, where the one or more solar panels are embedded into the deck of the bodyboard, and the one or more solar panels provides an amount of recharging energy to the battery whenever the bodyboard is left in a sunny location, where the bodyboard comprises at least three channels, where the at least three channels include a deck channel, a bottom channel, and a rail channel, and where the deck channel is located on the deck, where the bottom channel is located on the bottom, and where the rail channel is located on the rail, where the length is less than four feet.

2. The bodyboard of claim 1, where the bodyboard comprises at least four channels, where the at least four channels include a deck channel, a bottom channel, and two rail channels, and where the deck channel is located on the deck, where the bottom channel is located on the bottom, and where one of the two rail channels is located on the port rail, and one of the two rail channels is located on the starboard rail.

3. The bodyboard of claim 1, where the bodyboard additionally comprises one or more grippers, where the one or more grippers removably retain the cover.

4. The bodyboard of claim 1, where the bodyboard has a flexible core, where the height of the bodyboard is less than two inches, where the LED light rope serves a decorative purpose only, and where the bodyboard does not have any handles or straps.

5. A bodyboard for surfing ocean waves with LED light decorations, comprising: a bodyboard, where the bodyboard has a deck, a bottom, a bow, a stern, and two rails, where the two rails comprise a port rail and a starboard rail, where the bodyboard has a length, where the bodyboard has a height, at least one channel, where the at least one channel is a molded channel, where the molded channel comprises an indentation into a foam core of the bodyboard, and where a bodyboard skin covers the indentation, at least one LED light rope comprising LED lights, a cover, a battery, a battery compartment, and a battery compartment cover, where the channel comprises a cavity with a cavity width, a cavity length, and a cavity depth, where the at least one LED light rope is disposed in the at least one channel, and covered by the cover, and the battery is disposed in the battery compartment, and covered by the battery compartment cover, and where the at least one LED light rope is electronically attached to the battery, and, additionally comprising one or more solar panels, where the one or more solar panels are flexible solar panels, where the one or more solar panels are embedded into the deck of the bodyboard, and where the cover is removable such that a user can remove a first type of LED light rope and replace it with a second type of LED light rope.

6. The bodyboard of claim 5, where the bodyboard does not have any handles or straps and where the height of the bodyboard is less than two inches.

7. The bodyboard of claim 5, where the bodyboard comprises at least three channels, where the at least three channels include a deck channel, a bottom channel, and a rail channel, and where the deck channel is located on the deck, where the bottom channel is located on the bottom, and where the rail channel is located on the rail.

8. The bodyboard of claim 5, where the bodyboard comprises at least four channels, where the at least four channels include a deck channel, a bottom channel, and two rail channels, and where the deck channel is located on the deck, where the bottom channel is located on the bottom, and where one of the two rail channels is located on the port rail, and one of the two rail channels is located on the starboard rail.

9. The bodyboard of claim 5, where the length is less than four feet.

10. The bodyboard of claim 5, where the bodyboard additionally comprises one or more grippers, where the one or more grippers removably retain the cover.

11. The bodyboard of claim 5, where the bodyboard has a flexible core and has the capacity to remain unbroken when used in average six-foot surf.

12. The bodyboard of claim 5, where the LED light rope serves a decorative purpose only.

13. The bodyboard of claim 5, the battery compartment cover is waterproof, and, where the battery compartment cover additionally comprises an access screw, where the access screw can be used to remove the battery compartment cover to allow access to the battery, and, where the cover is made from fiberclad material.

14. The bodyboard of claim 5, where the cover additionally comprises one or more artistic embellishments, and, where the battery compartment cover additionally comprises a waterproof control button, where the waterproof control button can be pushed by the user to turn on and turn off the LED lights.

15. The bodyboard of claim 5, where the at least one channel has a creative shape, where the creative shape is an eye-pleasing shape, where the battery compartment cover is permanent and waterproof, and where the battery compartment cover additionally comprises a waterproof control button, where the waterproof control button can be pushed by the user to turn on and turn off the LED lights.

* * * * *